United States Patent Office 3,465,026
Patented Sept. 2, 1969

3,465,026
BORATE N - OXIDES DERIVED FROM BORATE ESTERS OF AMINO SECONDARY ALKANOLS
Graham Keith Hughes, Edina, Minn., assignor to Ashland Oil & Refining Company, Ashland, Ky., a corporation of Kentucky
No Drawing. Filed May 16, 1966, Ser. No. 550,157
Int. Cl. C07f 5/04; B01f 17/00
U.S. Cl. 260—462                                                                       6 Claims

ABSTRACT OF THE DISCLOSURE

N-oxides of borate esters of 1-dialkylamino-2-alkanols are disclosed, these compounds being used in detergent formulations, and as wetting and dispersing agents.

---

This invention relates to a process for the preparation of N-oxides of borate esters of amino secondary alkanols. In another aspect, it relates to the preparation of quaternary ammonium salts and N-oxide derivatives of borate esters of 1-dialkylamino-2-alkanols.

In copending application Ser. No. 550,101, filed May 16, 1966, the inventor herein disclosed novel borate esters of amino secondary alkanols and methods of preparing the novel borate esters. In this application N-oxide derivatives of the borate esters and processes for their preparation are disclosed and claimed.

Briefly, according to one aspect of this invention, a new class of compounds is provided, which compounds are N-oxides of borate esters of amino-substituted secondary alkanols, said N-oxides having the general formulae:

(I) 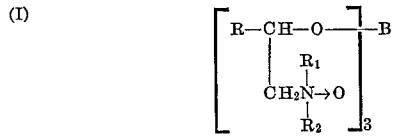

(II) 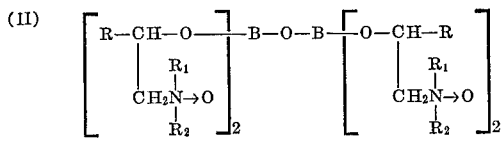

(III) 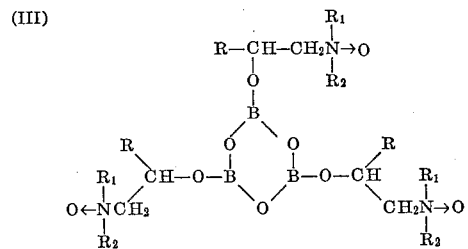

where $R_1$ and $R_2$ are alkyl groups having 1 to 22 carbon atoms, preferably 1 to 8 carbon atoms, or are lower alkyl groups substituted with aryl, cyclo alkyl, cyclo alkenyl, alkaryl, alkylcycloalkyl, or alkylcycloalkenyl groups having 6 to 10 carbon atoms, or $R_1$ and $R_2$ can together with the nitrogen atom form a heterocyclic nitrogen group having 2 to 6 ring carbon atoms; and R is an alkyl group, either straight or branched chain having from 6–22 carbon atoms, preferably 9–16 carbon atoms, or R is an alkoxy-substituted alkyl having from 8–22, preferably from 9–16 carbon atoms.

These N-oxides are prepared, according to another aspect of this invention, by oxidizing borate esters of amino secondary alkanols at temperatures in the range of 40–80° C., with an oxidizing agent, such as hydrogen peroxide. The particular N-oxide which is prepared depends, of course, upon the borate ester which is oxidized.

The borate esters can be prepared by reacting amino-substituted secondary alkanols with boric acid as disclosed in the copending application mentioned above. Depending upon the mole ratio of alkanol to acid, the borate esters having the following general formulae are produced:

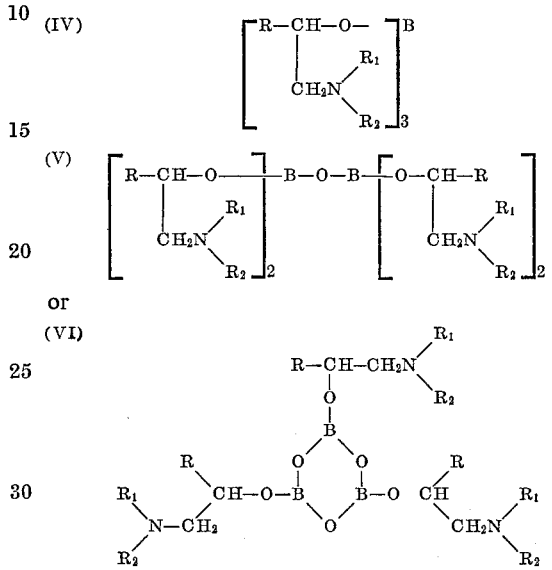

It will be apparent that the ester corresponding to Formula IV above can be oxidized to obtain the N-oxide corresponding to Formula I. Further, esters V and VI can be oxidized to obtain N-oxides II and III, respectively.

The amino-substituted secondary alkanols can be prepared by reacting 1,2-epoxides of long-, straight-, or branched-chain, terminally unsaturated mono-olefins, such as those having 8 to 24 carbon atoms, preferably 11 to 18 carbon atoms, per molecule, with a secondary amine or secondary hydroxy amine, such as dimethylamine, diethylamine, dipropylamine, dioctylamine, methyl ethylamine, ethyl butylamine, ethyl ethanolamine, diethanolamine, diisopropanolamine, diglycerolamine, cyclohexylmethylamine, morpholine, piperidine, 3,5-bis(hydroxymethyl) morpholine, pyrrolidine, pyrrole, azepine, aziridine, azetidine, hexahydroazepine, methyl benzylamine, ethylphenethylamine, methyl 1-naphthalene methylamine, and the like.

The 1,2-epoxides used in preparing such amino secondary alkanols can, in turn, be prepared by the epoxidation of said terminal olefins with an aliphatic peracid, such as peracetic acid. Such terminal olefins can be used singly or in admixture, and they can be straight-chain or branched-chain terminal olefins. Long, straight-chain terminal mono-olefins can be obtained from petro-chemical sources, for example, by cracking of petroleum waxes or by polymerization of ethylene using Ziegler catalysts such as trialkylaluminum. Representative 1-olefins which can be used to prepare the 1,2-epoxide precursors include 1-decene, 1-hendecene, 1-dodecene, 1-hexadecene, 1-octadecene, 1-eicosene, and the like, including mixtures thereof. Table I sets forth a description and specifications for some long chain, terminal mono-olefin mixed fractions commercially available from petro-chemical sources which can be epoxidized to prepare the precursor 1,2-epoxides of said amino secondary alkanols. Where such terminal mono-olefins are used as the initial precursors of the amino-substituted alkanols, the borate esters, prepared in this invention, will be mixtures of said esters, the various carbon chain lengths of the beta-substituted group attached to the nitrogen atom corresponding to that of the olefin fraction.

invention include the N-oxides of any of the borate esters of the aforementioned amino secondary alkanols, such as the N-oxide of the borate ester of beta-hydroxy-$C_{11-14}$ alkyldimethylamine.

TABLE I

| Total straight chain Alpha olefins, percent. | $C_9$—$C_{11}$, 87 | $C_{11}$—$C_{15}$, 87 | $C_{12}$—$C_{16}$, 93.5 | $C_{15}$—$C_{20}$, 86 | $C_{15}$—$C_{18}$, 88.8 | $C_{20}+69$ |
|---|---|---|---|---|---|---|
| Carbon No. distributing percent: | | | | | | |
| $C_8$ | 1 | | | | | |
| $C_9$ | 22 | | | | | |
| $C_{10}$ | 55 | 1 | 0.7 | | | |
| $C_{11}$ | 21 | 13 | | | | |
| $C_{12}$ | 1 | 24 | 41.3 | | | |
| $C_{13}$ | | 24 | | | | |
| $C_{14}$ | | 24 | 31.9 | 1 | 1 | |
| $C_{15}$ | | 13 | | 12 | 27 | |
| $C_{16}$ | | 1 | 25.6 | 19 | 29 | |
| $C_{17}$ | | | | 18 | 28 | |
| $C_{18}$ | | | | 18 | 15 | |
| $C_{19}$ | | | | 17 | | |
| $C_{20-26}$ | | | 0.5 | 15 | | 77 |
| $C_{26-42}$ | | | | | | 23 |
| Specific gravity 20° C., g/ml | 0.747 | 0.769 | 0.769 | 0.790 | 0.784 | 0.865 |

Representative amino secondary alkanols which are converted to the borate esters by reaction with boric acid and according to this invention include: beta-hydroxy-$C_{11-14}$-alkyldimethylamine, beta-hydroxy-$C_{15-19}$-alkyldimethylamine, and the like, including their polypropoxylated derivatives, e.g., polypropoxylated distearyl ethanolamine, polypropoxylated beta-hydroxy-$C_{11-14}$-alkyldimethylamine, and the like. Also, included among representative amino secondary alkanols are:

3-hydroxy butyl dimethylamine,
9-hydroxystearyl dimethylamine,
1-dimethylamino-2-decanol,
1-dimethylamino-2-hendecanol,
1-(N-methyl-N-ethylamino)-2-dodecanol,
1-dipropylamino-2-tridecanol,
1-(N-ethyl-N-butyl)-amino-2-tetradecanol,
1-(N-pentyl-N-hexyl)amino-2-pentadecanol,
1-(N-methyl-N-heptyl) amino-2-hexadecanol,
1-(N-heptyl-N-octyl)-amino-2-octadecanol,
1-dioctylamino-2-eicosanol,
1-dibutylamino-2-heneicosanol,
1-dimethyl amino-2 nonadecanol,
1-diethylamino-2-eicosanol,
1-dipentylamino-2-docosanol,
1-(N-methyl-N-ethyl)amino-2-tricosanol,
1-dioctylamino-2-tricosanol,
N-(2-hydroxydecyl) pyrrolidine,
N-(2-hydroxyoctyl)piperidine,
N-(2-hydroxyeicosyl) decahydroquinoline,
1-(bis-2-hydroxyethyl) amino-2-decanol,
1-(methyl-2-hydroxyethyl)amino-2-dodecanol,
1-(bis-2-hydroxypropyl) amino-2-tetradecanol,
1-(methyl-2-hydroxypropyl)-amino-2-octadecanol,
1-(N-methyl-N-butyl) amino-2-eicosanol, and the like, including mixtures thereof.

As stated above, the N-oxides of this invention are prepared by oxidizing borate esters of amino-substituted secondary alkanols at temperatures in the range of 40–80° C. with an oxidizing agent, such as hydrogen peroxide. The hydrogen peroxide used in carrying out this oxidation is preferably aqueous hydrogen peroxide having a concentration of about 27–98 weight percent. The amount of hydrogen peroxide used is preferably 1 to 25 percent in excess of the stoichiometric amount. Water or a lower alkanol such as methanol, ethanol, propanol or butanol can be added if desired during the course of the oxidation reaction to keep the reaction mixture fluid. The N-oxide products will generally be water-soluble and can be used, for example, in detergent formulations and as wetting or dispersing agents or can be used as intermediates in chemical synthesis.

Representative N-oxides of the borate esters of amino secondary alkanols which can be made according to this

EXAMPLE I

In this example, 55 grams of the borate ester of beta-hydroxy-$C_{15-18}$-alkyldimethylamine (prepared by reacting 1 mole of the amine with ½ mole of boric acid) were reacted with 12 grams of 50% hydrogen peroxide to prepare the N-oxide of the borate ester which corresponds to the following general formula:

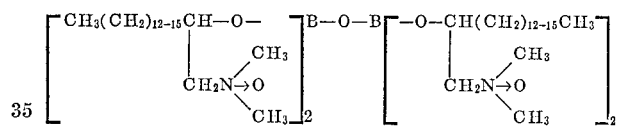

To obtain the N-oxide, the borate ester was charged to a reaction flask and warmed to 60° C. after which the hydrogen peroxide was added slowly. The temperature was maintained at about 60° C., 118 grams of water were added during the reaction. 174 grams of N-oxide product were obtained after the reaction was completed (3½ hours).

The N-oxide is added to a dishwashing detergent formulation as a foam stabilizer. Good foam stabilizing properties are noted.

EXAMPLE II

In this example 104 grams of the borate ester of beta-hydroxy-$C_{11-14}$-alkyldimethyl amine (prepared by reacting ½ mole of the amine with ¼ mole of boric acid) are reacted according to the method of Example I with 30 grams of hydrogen peroxide to obtain the N-oxide of the ester. 241 grams of water were added during the reaction which was run for 1¼ hours until complete.

The resulting N-oxide was incorporated in a commercial dishwashing detergent formulation comprising linear alkyl sulfate, sodium lauryl ethoxylated sulfate, water and varying amounts of the N-oxide. The properties of the formulations were compared with those which contained, instead of the above N-oxide, (a) dimethyldodecyl amine oxide and (b) alkanalamide. The N-oxide of this invention showed surprisingly good foam stabilizing characteristics.

EXAMPLE III

In this example, 133 grams of the borate ester of beta-hydroxy-$C_{11-14}$-alkyldimethyl amine (prepared by reacting 3 moles of the amine with 1 mole of boric acid) were reacted according to the method of Example I with 38 grams of 50% hydrogen peroxide to obtain the corresponding N-oxide. 300 grams of water were added during the reaction, which was run for 1 hour and 40 minutes until complete. 435 grams of N-oxide product were obtained. The product had a structure which corresponds to general Formula I (above).

EXAMPLE IV

In this example, 136 grams of the borate ester of beta-hydroxy - $C_{11-14}$-alkyl-dimethyl amine (prepared by reacting one mole of the amine with one mole of boric acid) were reacted according to the method of Example I with 34 grams of 50% hydrogen peroxide (a 10% excess) to obtain the coresponding N-oxide. 323 grams of water were added during the reaction, which was run for 3 hours and 45 minutes until complete. 465 grams of product were obtained. The product had a structure which corresponds to general Formula III (above).

I claim:

1. As a class of compounds, the N-oxides of boric acid esters of 1-dialkylamino-2-alkanols, said compounds having the general formulas:

(I) 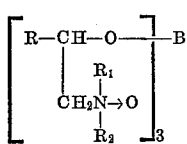

(II) 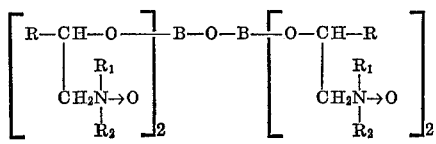

(III) 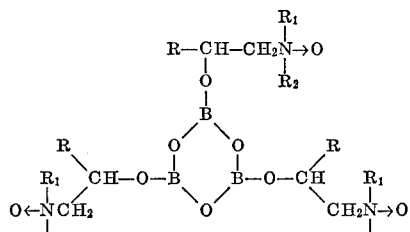

where R is an alkyl group having 6 to 22 carbon atoms and, $R_1$ and $R_2$ are alkyl groups having 1 to 8 carbon atoms.

2. N-oxides of claim 1 where $R_1$ and $R_2$ are methyl groups.

3. N-oxides of claim 2 where R is an alkyl group having 9 to 16 carbon atoms.

4. N-oxides of claim 3 having said general Formula I.

5. N-oxides of claim 3 having said general Formula II.

6. N-oxides of claim 3 having said general Formula III.

References Cited

UNITED STATES PATENTS 2,259,175  10/1941  Paul _____ 260—808
3,072,737  1/1963  Chen _____ 174—110

LEON ZITVER, Primary Examiner

L. DE CRESCENTE, Assistant Examiner

U.S. Cl. X.R.

252—135, 351, 380; 260—567.6